United States Patent [19]
Koo

[11] Patent Number: 5,883,908
[45] Date of Patent: Mar. 16, 1999

[54] DEVICE FOR DETECTING ERROR FROM DIGITAL DATA

[75] Inventor: Bon Ho Koo, Seoul, Rep. of Korea

[73] Assignee: LG Electronics Inc., Seoul, Rep. of Korea

[21] Appl. No.: 740,688

[22] Filed: Nov. 1, 1996

[30] Foreign Application Priority Data

Nov. 3, 1995 [KR] Rep. of Korea .................. 1995/39597

[51] Int. Cl.$^6$ ................................................. G11C 29/00
[52] U.S. Cl. ...................... 371/40.14; 371/40.4; 395/306
[58] Field of Search .............................. 371/40.14, 40.4; 395/180, 287, 306, 891; 711/114, 3; 701/1

[56] References Cited

U.S. PATENT DOCUMENTS

| | | | |
|---|---|---|---|
| D. 295,855 | 5/1988 | Koo | D14/5 |
| 4,675,553 | 6/1987 | Price et al. | 327/215 |
| 5,218,680 | 6/1993 | Farrell et al. | 395/200.45 |
| 5,592,632 | 1/1997 | Leung et al. | 395/306 |
| 5,613,077 | 3/1997 | Leung et al. | 395/306 |
| 5,621,710 | 4/1997 | Koo | 369/50 |
| 5,666,480 | 9/1997 | Leung et al. | 395/180 |

*Primary Examiner*—Reba I. Elmore
*Assistant Examiner*—Marc McDaniel
*Attorney, Agent, or Firm*—Birch, Stewart, Kolasch & Birch LLP

[57] ABSTRACT

Device for detecting an error from a digital data during decoding the digital data, is disclosed, including a storage means for temporary storage of received arbitrary bytes of data (a parallel data) in response to a control signal and producing the data in byte units separately; logical operation means for subjecting each of the byte unit data from the storage means to an operation according to a preset logical operation equation in response to a control signal for producing a data separately; error detecting means for comparing the data from the logical operation means in determining an occurrence of error; and, controlling means for providing the control signals.

9 Claims, 5 Drawing Sheets the first data bit the last data bit

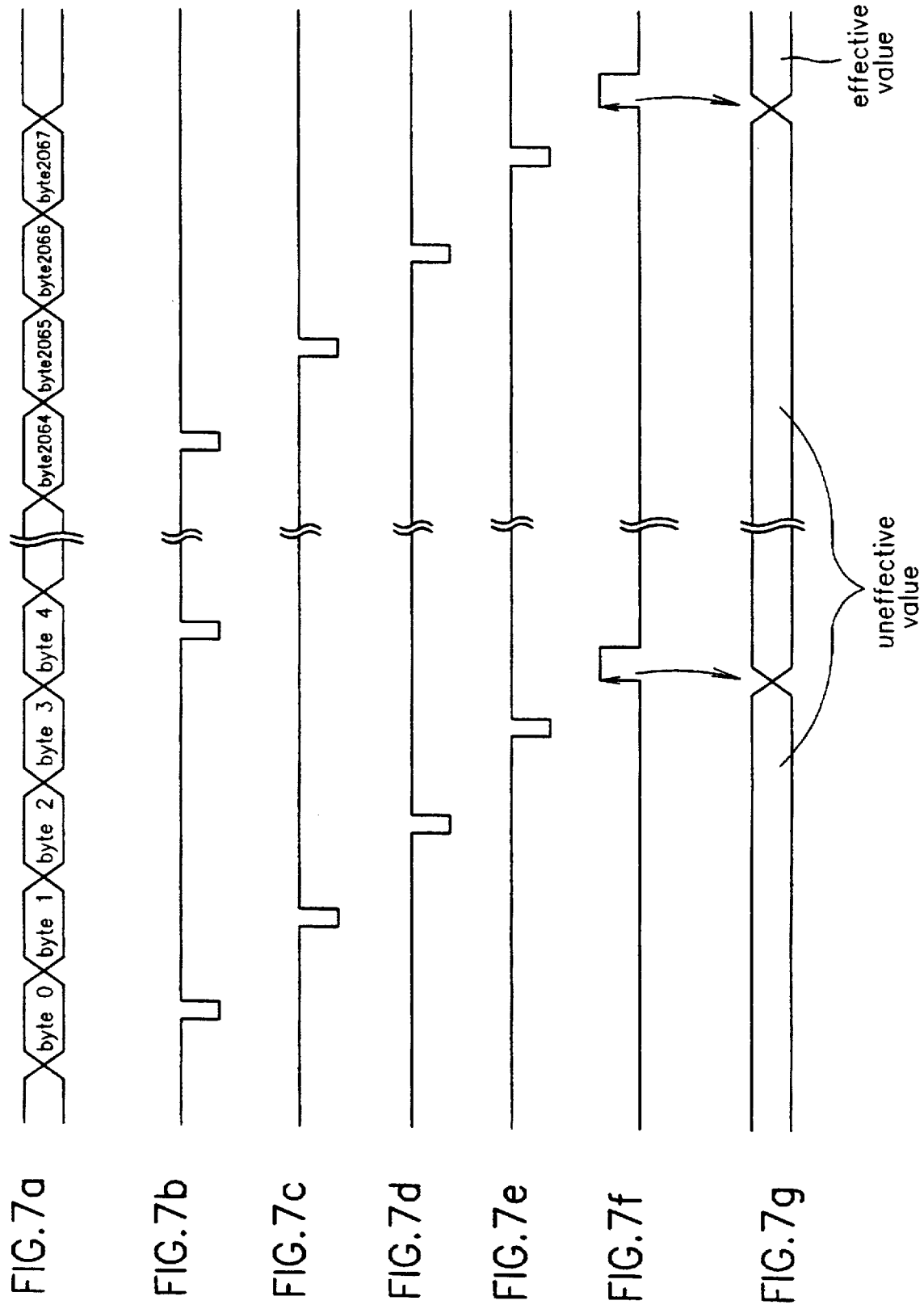

DEVICE FOR DETECTING ERROR FROM DIGITAL DATA

BACKGROUND OF THE INVENTION

1. Field of the Invention

The present invention relates to a decoder in a CD ROM driver and, more particularly, to a device for detecting an error from a digital data during decoding the digital data.

2. Discussion of the Related Art

In general, the CD ROM decoder has an error corrected in case the error is occurred in a data and determines final correction of the error in the data using an EDC (Error Detection Code).

FIG. 1 illustrates a data recording format on the CD ROM, in which the error detection code is shown.

Referring to FIG. 1, the error detection code is a 4 bytes parity calculated with the following equation for a total 2046 bytes including 12 bytes sync, 4 bytes header and 2048 bytes information data.

$$P(X) = (X^{16} + X^{15} + X^2 + 1) \times$$

$$(X^{16} + X + 1)X^{32} + X^{31} + X^{16} + X^{15} + X^4 + X^3 + X + 1$$

equation (1)

That is, the CD ROM determines that there is an error in data if a remainder after making a dividing operation of the 2068 bytes including the sync, header, information data and error detection code with the above equation (1) is not "0". The process for decoding a signal recorded on a digital signal recording medium, such as the CD ROM includes a step for correcting errors, in which cases when a regular signal could not be read-in due to defects in the disc, mistakes in manufacturing, and errors in a servo or synchronizing signal are corrected. It also includes an error detection step, in which the error corrected data is once again inspected to confirm the state of the regular error correction.

A conventional device for detecting an error from within digital data in a CD ROM will be explained with reference to the attached drawings. FIG. 2 illustrates a block diagram showing the conventional device for detecting an error from a digital data in a CD ROM, and FIG. 3 illustrates a circuit diagram showing a detail of the dividing operation part shown in FIG. 2.

Referring to FIG. 2, the conventional device for detecting an error from within digital data in a CD ROM includes a data converting part 100 for converting a received byte unit parallel data into a bit unit series data in response to an operation clock signal, and an operation part 110 for subjecting the converted series data in bit unit series data to an operation according to the equation (1) in response to an operational clock signal, for producing final error(s).

Referring to FIG. 3, the operation part 110 includes a plurality of D-flipflops D1~D32 connected in series for temporarily storing the bit unit series data from the data converting part 100 in response to an operational clock signal for and producing the stored data after shifted, a first exclusive OR gate E1 for receiving and subjecting the bit unit series data from the data converting part 100 and an output from the flipflop D32 to an exclusive OR operation and for applying the exclusive OR operation result to the flipflop D1, a second exclusive OR gate E2 for receiving and subjecting the output from the flipflop D32 and an output from the flipflop D1 to an exclusive OR operation and applying the exclusive OR operation result to the flipflop D2, a third exclusive OR gate E3 for receiving and subjecting the output from the flipflop D32 and an output from the flipflop D3 to an exclusive OR operation and applying the exclusive OR operation result to the flipflop D4, a fourth exclusive OR gate E4 for receiving and subjecting the output from the flipflop D32 and an output from the flipflop D4 to an exclusive OR operation and applying the exclusive OR operation result to the flipflop D5, a fifth exclusive OR gate E5 for receiving and subjecting the output from the flipflop D32 and an output from the flipflop D15 to an exclusive OR operation and applying the exclusive OR operation result to the flipflop D16, a sixth exclusive OR gate E6 for receiving and subjecting the output from the flipflop D32 and an output from the flipflop D16 to an exclusive OR operation and applying the exclusive OR operation result to the flipflop D17, a seventh exclusive OR gate E7 for receiving and subjecting the output from the flipflop D32 and an output from the flipflop D31 to an exclusive OR operation and applying the exclusive OR operation result to the flipflop D32 again, and a NOR gate N1 for receiving each of the outputs from the flipflops D1~D32 and subjecting those outputs to an NOR operation.

The operation of the aforementioned system will be explained.

FIG. 4 illustrates a sequence of data reception for detecting an error. Byte unit parallel data stored in a memory (not shown), such as an SRAM or DRAM, i.e., the 2068 bytes including the sync, header, information data, error detection code shown in FIG. 1 are received at the data converting part 100. The received byte unit parallel data are converted into bit unit series data in response to a provided operation clock and applied to the operation part 110. The applied series data are 2068 bytes×8 bits=16544 bits of series data. An operation clock is required for each bit of the applied series data, i.e., 16544 operation clocks are required. In the application of data to the operation part 110, the 16544 bits of data are applied from the least significant bit (LSB) to the most significant bit (MSB) in an order as shown in FIG. 4.

The operation of the operation part 110 will be explained with reference to FIG. 3.

As explained, the operation part 110 has 32 flipflops D1~D32 connected in series, and, of the 32 flipflops D1~D32, one of the exclusive OR gates E1~E7 is connected to an input terminal of the first flipflop D1, the second flipflop D2, the fourth flipflop D4, the fifth flipflop D5, 16th flipflop D16, 17th flipflop D17 and 32nd flipflop D32. All the exclusive OR gates E1~E7 receive the output Q31 from the 32nd flipflop D32, and 16544 number of operation clocks are applied to each of the flipflops D1~D32. The NOR gate N1 receives each of the outputs Q0~Q31 from the flipflops D1~D32 and conducts an NOR operation to determine occurrence of error data finally. That is, when each of the data obtained in each of the flipflops D1~D32 according to the equation (1) is applied to the NOR gate N1, if all these applied data are "0", i.e., a low signal is produced, to determine that no error has occurred. And, of each of the data applied from each of the flipflops D1~D32 to the NOR gate N1, if a data of "1" is applied from any one of the data, a data of "1" is produced, to determine that an error has occurred and that the data correction has not been properly performed, finally.

The processing time for operations of digital data storage, error correction, error detection and data transmission in a conventional CD ROM drive will be examined with reference to FIG. 5. FIG. 5 illustrates time basis operations of the CD ROM decoder, wherein it can be seen that the CD ROM decoder processes one block data of 2352 bytes for the data storage, error correction, error detection and data transmission in time sharing.

In case of 1X CD ROM, the processing time for a process like that shown in FIG. 5 takes about 13.33 msec, and in case of 8X CD ROM, it takes 13.33 msec/8, i.e., about 1.67 msec. And, in case of 10X CD ROM, it takes 13.33 msec/10, i.e., about 1.333 msec. As can be know from this process, since reduction in the time required for the error detection allows allocation of more time to the data transmission and the like, a higher speed CD ROM drive could be realized.

Since the conventional device for detecting an error from within recorded digital data for the CD ROM driver converts bit unit parallel data stored in a memory into bit unit series data and applies an operation clock to every converted data bit, the lengthy error detection time causes a problem of hindering the CD ROM driver from being provided with a higher speed.

SUMMARY OF THE INVENTION

Accordingly, the present invention is directed to a device for detecting an error from a digital data that substantially obviates one or more of the problems due to limitations and disadvantages of the related art.

An object of the present invention is to provide a device for detecting an error from a recorded digital data for a CD ROM driver, which can minimize the number of operation clocks for higher speed error detection.

Another object of the present invention is to provide a method corresponding to the aforementioned device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for detecting an error from a recorded digital data for a CD ROM driver, including, in the device for detecting an error from a recorded digital data for a CD ROM driver, a storage means for temporary storage of a received arbitrary bytes of data (a parallel data) in response to a control signal and producing the data in byte units, logical operation means for subjecting each of the byte unit data from the storage means to an operation according to a preset logical operation equation in response to a control signal for producing a data, error detecting means for comparing the data from the logical operation means in determining an error occurrence, and controlling means for providing the control signal.

In other aspect of the present invention, there is provided a device for detecting an error from a recorded digital data for a CD ROM driver, including, in the device for detecting an error from a recorded digital data for a CD ROM driver, a first storage part for receiving byte unit received data from an arbitrary data block in digital data recorded in the CD ROM after error correction, temporary storage of the data by an arbitrary bit unit, and producing the stored data in response to a production timing control signal, a logic circuit part for composing a status after an arbitrary number of bytes×8 clocks based on the data from the first storage part and logical processing of the status, a second storage part for temporary storage of the data from the logic circuit part and feeding the data back to the logic circuit part, an error determining part for mutual operation of each of the produced data in determining the data of an error occurrence, and a timing controlling part for providing the production timing control signal and the clock signal.

In another aspect of the present invention, there is provided a method for detecting an error from a recorded digital data for a CD ROM driver, including the steps of, in the method for detecting an error from a recorded digital data for a CD ROM driver, (1) temporary storage of received arbitrary byte data (parallel data) in response to a control signal and producing the data in byte units, (2) subjecting each of the produced byte unit data to an operation according to a preset logical operation equation in response to a control signal for producing a data, and (3) subjecting the produced data in the (2) step to an NOR operation in determining occurrence of an error.

In further aspect of the present invention, there is provided a method for detecting an error from a recorded digital data for a CD ROM driver, including the steps of, in the method for detecting an error from a recorded digital data for a CD ROM drive, (1) receiving byte unit received data from an arbitrary data block in digital data recorded in the CD ROM after error correction, temporary storage of the data by an arbitrary bit unit, and producing the stored data in response to a production timing control signal, (2) composing a status after an arbitrary number of bytes×8 clocks based on the data from the (1) step and logical processing of the status according to a preset logical operation equation, (3) temporary storage of the logically processed data in response to a clock signal and feeding the data back to the (2) step, mutual comparison of each of the produced data in determining the data of an error occurrence.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
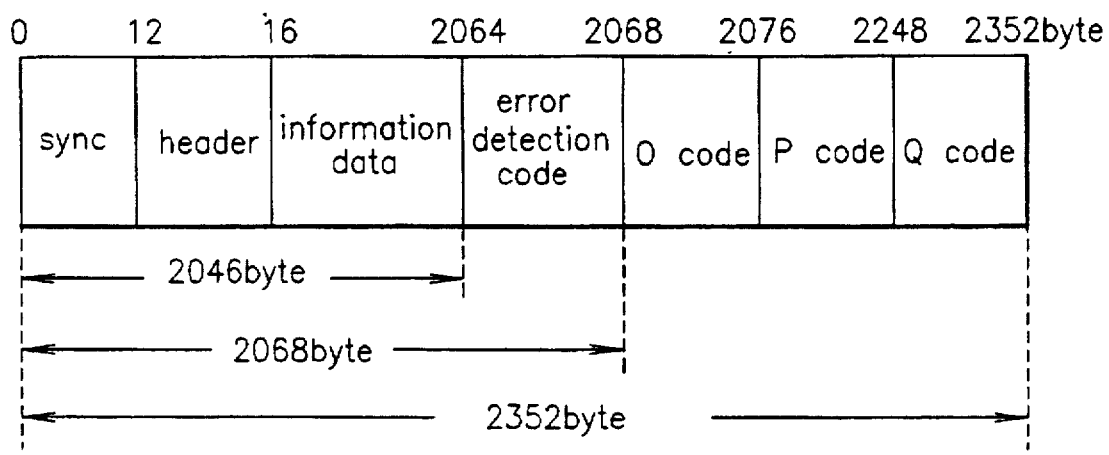
FIG. 1 illustrates a data recording format on a general CD ROM.
Figure 2:
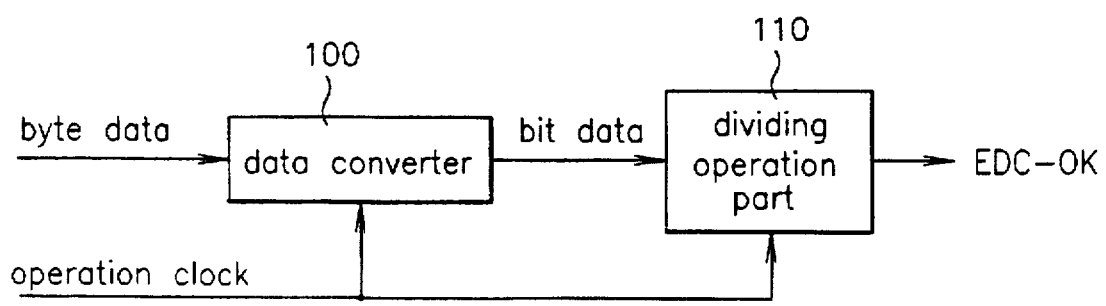
FIG. 2 illustrates a block diagram showing a conventional device for detecting an error from a digital data for a CD ROM driver.
Figure 3:
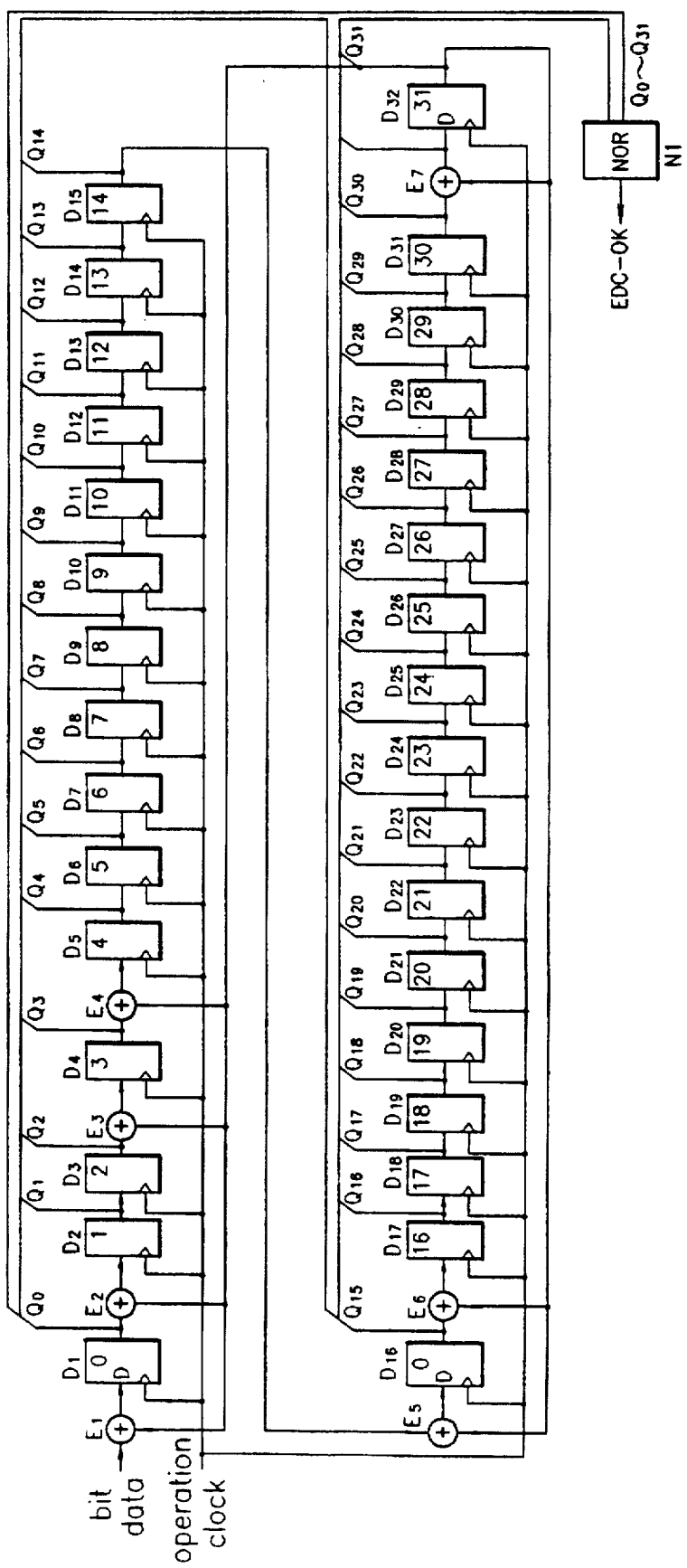
FIG. 3 illustrates a circuit diagram showing a detail of the operation part shown in FIG. 2.
Figure 4:
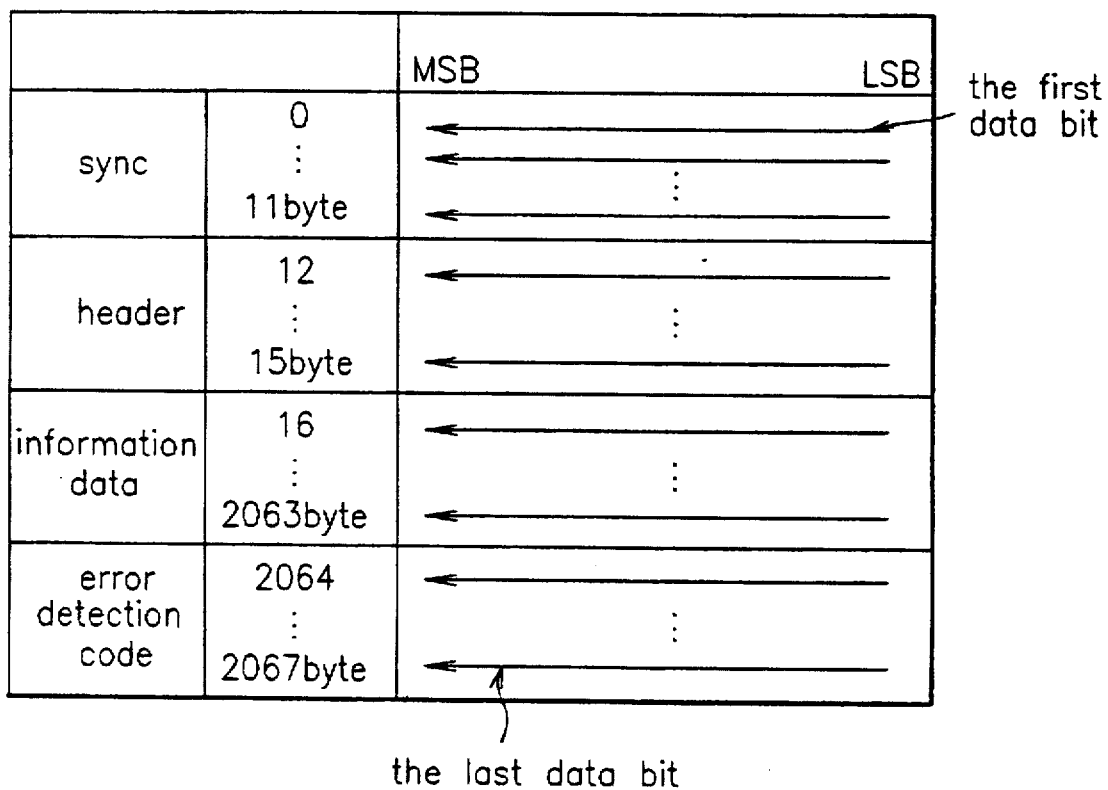
FIG. 4 illustrates a sequence of data reception for detecting an error.
Figure 5:
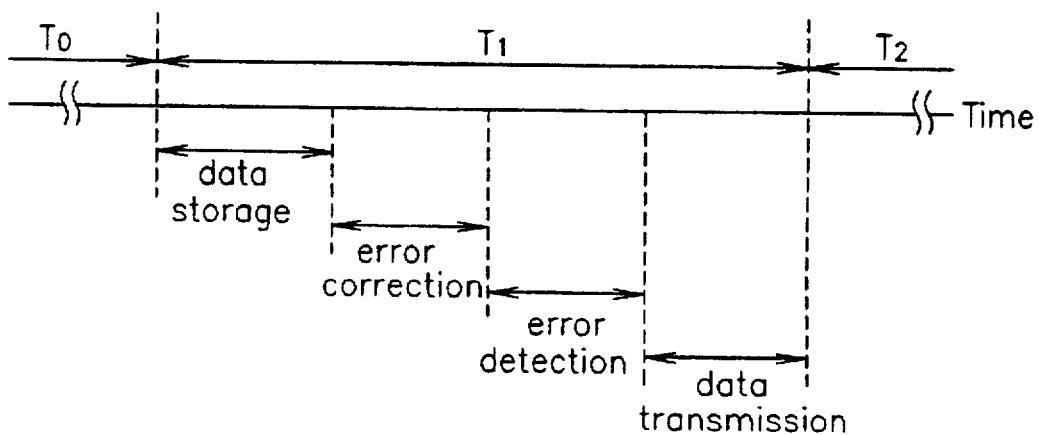
FIG. 5 illustrates time basis operations of a conventional CD ROM decoder.
Figure 6:
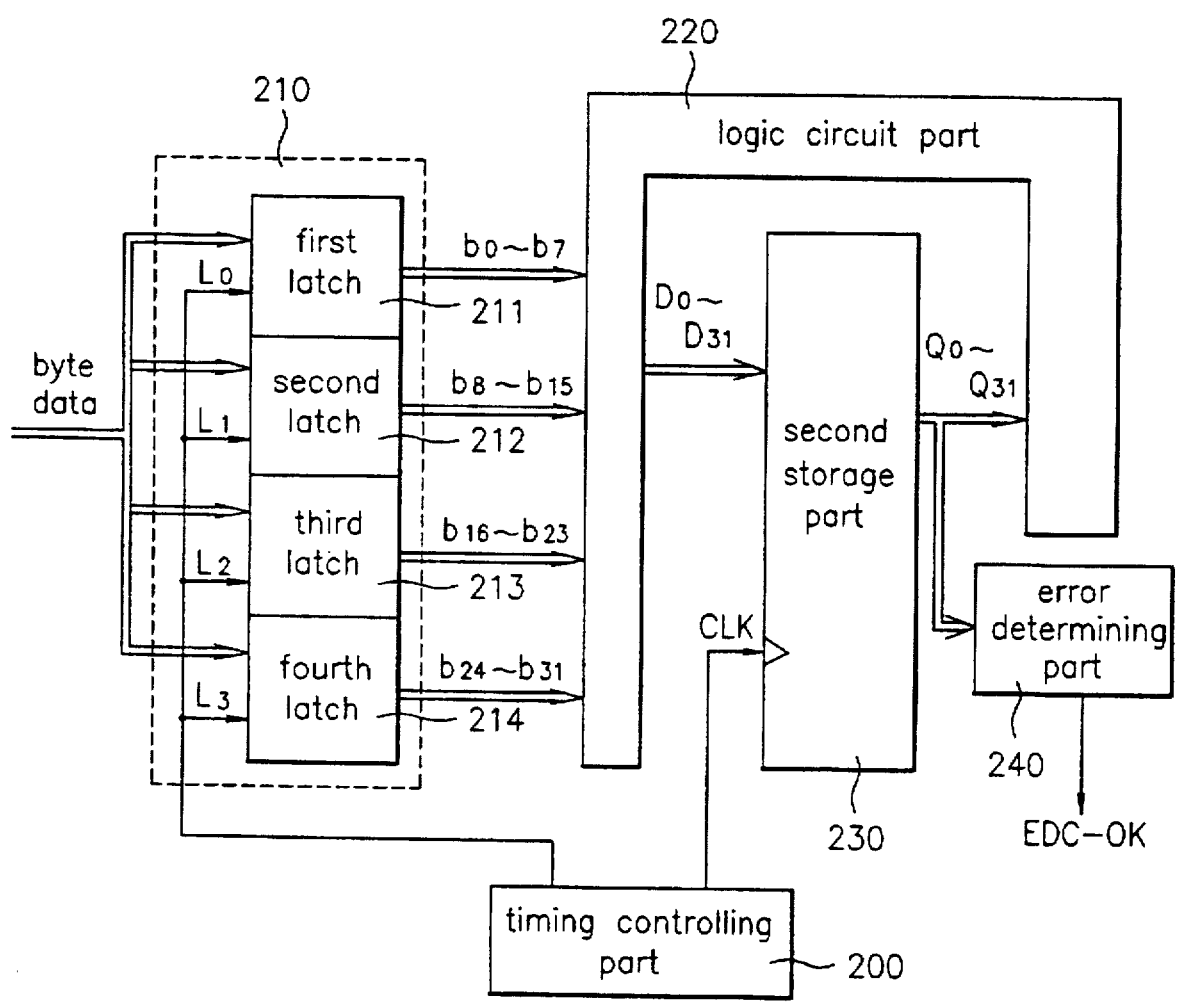
FIG. 6 illustrates a block diagram showing a device for detecting an error from a digital data in a CD ROM decoder in accordance with a preferred embodiment of the present invention; and, FIGS. 7a~7g show operation timings of the device shown in FIG. 6.

FIG. 6 illustrates a block diagram showing a device for detecting an error from within digital data in a CD ROM decoder in accordance with a preferred embodiment of the present invention.

Referring to FIG. 6, the device for detecting an error from a digital data in a CD ROM decoder includes a first storage part 210 for receiving at least one byte unit received data from an arbitrary block of data in recorded digital data after error correction, for temporarily storing arbitrary bytes of data, and for producing $b_0$~$b_{31}$ the stored data in response to a production timing control signal $L_0$~$L_1$, a logic circuit part 220 for composing a status after arbitrary bytes×8 clocks based on the data $b_0$~$b_{31}$ from the first storage part 210 and for logically processing the status, a second storage part 230 for temporarily storing the data $D_0$~$D_{31}$ from the logic circuit part 220 in response to a clock signal CLK and producing $Q_0$~$Q_{31}$ the data $D_0$~$D_{31}$, an error determining part 240 for mutual operation of each of the produced data $Q_0$~$Q_{31}$ in determining the occurrence of an error in the data, and a timing controlling part 200 for providing production timing control signals $L_0$~$L_1$ and the clock signal CLK.

The first storage part 210 includes a first latch 211 for latching the first byte data from four byte data in response to a first production timing control signal $L_0$ to produce one byte data $b_0$~$b_7$, a second latch 212 for latching the second byte data from four byte data in response to a second production timing control signal $L_1$ to produce one byte data $b_8$~$b_{15}$, a third latch 213 for latching the third byte data from four byte data in response to a third production timing control signal $L_2$ to produce one byte data $b_{16}$~$b_{23}$, and a fourth latch 214 for latching the fourth byte data from four byte data in response to a fourth production timing control signal $L_3$ to produce one byte data $b_{24}$~$b_{31}$.

The operation of the aforementioned device will be explained with reference to the attached drawings. FIGS. 7a~7g show operation timings of the device shown in FIG. 6.

First, of the byte unit parallel data stored in a memory (not shown) in the CD ROM driver, 4 byte unit parallel data is received at the first storage part 210. Of the 4 byte unit parallel data received at the first storage part 210, each of the first, second, third and fourth latches 211, 212, 213 and 214 receives by one bytes. Each of the latches 211, 212, 213 and 214 stores the one byte unit data temporarily in response to a sequence of signals $L_0$~$L_3$ from the timing controlling part 200 and applies $b_0$~$b_{31}$ to the logic circuit part 220 on the same time. In this instant, the timing controlling part 200 generates the latch control signals $L_0$~$L_3$, as shown in FIGS. 7b~7e, in a sequence for each of the bytes received at each of the latches 211, 212, 213 and 214. The data $b_0$~$b_{31}$ from the first storage part 210 and the data $Q_0$~$Q_{31}$ fed from the second storage part 230 back to the logic circuit part 220 are subjected to operations in the logic circuit part 220 according to each of the following logical equations, to form a status after the prior clock.

The operation equations performed in the logic circuit part 220 are as follows.

Each of the data $D_0$~$D_{31}$ produced from the logic circuit part 220 are describes as follows:

$D_0 = Q_0 \oplus Q_1 \oplus Q_2 \oplus Q_3 \oplus Q_4 \oplus Q_5 \oplus Q_6 \oplus Q_7 \oplus Q_8 \oplus Q_9 \oplus Q_{10} \oplus Q_{11} \oplus Q_{12} \oplus Q_{13} \oplus Q_{14} \oplus Q_{15} \oplus Q_{28} \oplus Q_{29} \oplus Q_{30} \oplus b_{31}$.

$D_1 = Q_0 \oplus Q_{16} \oplus Q_{28} \oplus Q_{31} \oplus b_{30}$.

$D_2 = Q_1 \oplus Q_{17} \oplus Q_{29} \oplus b_{29}$.

$D_3 = Q_0 \oplus Q_1 \oplus Q_2 \oplus Q_3 \oplus Q_4 \oplus Q_5 \oplus Q_6 \oplus Q_7 \oplus Q_8 \oplus Q_9 \oplus Q_{10} \oplus Q_{11} \oplus Q_{12} \oplus Q_{13} \oplus Q_{14} \oplus Q_{15} \oplus Q_{18} \oplus Q_{28} \oplus Q_{29} \oplus b_{28}$.

$D_4 = Q_0 \oplus Q_3 \oplus Q_{16} \oplus Q_{19} \oplus Q_{28} \oplus b_{27}$.

$D_5 = Q_1 \oplus Q_4 \oplus Q_{17} \oplus Q_{20} \oplus Q_{29} \oplus b_{26}$.

$D_6 = Q_2 \oplus Q_5 \oplus Q_{18} \oplus Q_{21} \oplus Q_{30} \oplus b_{25}$.

$D_7 = Q_3 \oplus Q_6 \oplus Q_{19} \oplus Q_{22} \oplus Q_{31} \oplus b_{24}$.

$D_8 = Q_4 \oplus Q_7 \oplus Q_{20} \oplus Q_{23} \oplus b_{23}$.

$D_9 = Q_5 \oplus Q_8 \oplus Q_{21} \oplus Q_{24} \oplus b_{22}$.

$D_{10} = Q_6 \oplus Q_9 \oplus Q_{22} \oplus Q_{25} \oplus b_{21}$.

$D_{11} = Q_7 \oplus Q_{10} \oplus Q_{23} \oplus Q_{26} \oplus b_{20}$.

$D_{12} = Q_8 \oplus Q_{11} \oplus Q_{24} \oplus Q_{27} \oplus b_{19}$.

$D_{13} = Q_9 \oplus Q_{12} \oplus Q_{25} \oplus Q_{28} \oplus b_{18}$.

$D_{14} = Q_{10} \oplus Q_{13} \oplus Q_{26} \oplus Q_{29} \oplus b_{17}$.

$D_{15} = Q_0 \oplus Q_1 \oplus Q_2 \oplus Q_3 \oplus Q_4 \oplus Q_5 \oplus Q_6 \oplus Q_7 \oplus Q_8 \oplus Q_9 \oplus Q_{10} \oplus Q_{11} \oplus Q_{12} \oplus Q_{13} \oplus Q_{15} \oplus Q_{27} \oplus Q_{28} \oplus Q_{29} \oplus b_{16}$.

$D_{16} = Q_0 \oplus Q_{12} \oplus Q_{15} \oplus Q_{16} \oplus b_{15}$.

$D_{17} = Q_1 \oplus Q_{13} \oplus Q_{16} \oplus Q_{17} \oplus b_{14}$.

$D_{18} = Q_2 \oplus Q_{14} \oplus Q_{17} \oplus Q_{18} \oplus b_{13}$.

$D_{19} = Q_3 \oplus Q_{15} \oplus Q_{18} \oplus Q_{19} \oplus b_{12}$.

$D_{20} = Q_4 \oplus Q_{16} \oplus Q_{19} \oplus Q_{20} \oplus b_{11}$.

$D_{21} = Q_5 \oplus Q_{17} \oplus Q_{20} \oplus Q_{21} \oplus b_{10}$.

$D_{22} = Q_6 \oplus Q_{18} \oplus Q_{21} \oplus Q_{22} \oplus b_9$.

$D_{23} = Q_7 \oplus Q_{19} \oplus Q_{22} \oplus Q_{23} \oplus b_8$.

$D_{24} = Q_8 \oplus Q_{20} \oplus Q_{23} \oplus Q_{24} \oplus b_7$.

$D_{25} = Q_9 \oplus Q_{21} \oplus Q_{24} \oplus Q_{25} \oplus b_6$.

$D_{26} = Q_{10} \oplus Q_{22} \oplus Q_{25} \oplus Q_{26} \oplus b_5$.

$D_{27} = Q_{11} \oplus Q_{23} \oplus Q_{26} \oplus Q_{27} \oplus b_4$.

$D_{28} = Q_{12} \oplus Q_{24} \oplus Q_{27} \oplus Q_{28} \oplus b_3$.

$D_{29} = Q_{13} \oplus Q_{25} \oplus Q_{28} \oplus Q_{29} \oplus b_2$.

$D_{30} = Q_{14} \oplus Q_{26} \oplus Q_{29} \oplus Q_{30} \oplus b_1$.

$D_{31} = Q_0 \oplus Q_1 \oplus Q_2 \oplus Q_3 \oplus Q_4 \oplus Q_5 \oplus Q_6 \oplus Q_7 \oplus Q_8 \oplus Q_9 \oplus Q_{10} \oplus Q_{11} \oplus Q_{12} \oplus Q_{13} \oplus Q_{14} \oplus Q_{27} \oplus Q_{28} \oplus Q_{29} \oplus Q_{31} \oplus b_0$.

The results of the operation thus conducted in the logic circuit part 220 are applied to the second storage part 230. The second storage part 230 applies each of the received data from the logic circuit part 220 to the 32 flipflops therein, respectively. In this instant, the 32 flipflops are supplied with a clock signal CLK provided from the timing controlling part 200. In response to the clock signal, the second storage part 230, i.e., each of the flipflops, produces a data $Q_0$~$Q_{31}$. Herein, it is assumed that each of the flipflops in the second storage part 230 is operative at a rising edge of the clock signal CLK, as shown in FIG. 7f provided from the timing controlling part 200. Each of the outputs $Q_0$~$Q_{31}$ from the second storage part 230 is fed back to the logic circuit part 220 and applied to the error determining part 240. Each of the applied 32 data is subjected to an NOR operation by the error determining part 240. That is, only if all the outputs $Q_0$~$Q_{31}$ from the second storage part 230 are "0", an output EDC-OK from the logic circuit part 240 becomes logic high.

otherwise, it becomes logic low. A logical high represents detection of no error, and a logical low represents detection of error(s). The error determining part 240 includes a NOR gate. In each block of data (2068 bytes), the last bytes range from the 2065th to 2068th are also applied to the first storage part 210, latched, and applied to the logic circuit part 220 and the second storage part 230. Then, an output EDC-OK for one block of data from the error determining part 240 that is produced only upon receipt of a rising edge of the clock signal CLK from the timing controlling part 200 as shown in FIG. 7f is received is determined to be an effective value as shown in FIG. 7g, and used to generate a right error detection confirmation signal. The clock signal CLK from the timing controlling part 200 is a signal having the rising edge after the generation of the control signals $L_0 \sim L_1$ in succession to be applied to each of the latches 211, 212, 213 and 214 in the first storage part 210, but before the activation of the first latch control signal $L_0$. In other words, the operation is completed through the logic circuit part 220 and the second storage part 230 before the reception of new 4 byte parallel data.

Since the device for detecting an error in a recorded digital data of the present invention detects error(s), not in bit units after converting the received parallel data into series data, but in byte units, i.e., as parallel data, the device can minimize the error detecting time, allowing a CD ROM capable of driven at a higher speed.

It will be apparent to those skilled in the art that various modifications and variations can be made in a device for detecting an error in a digital data of the present invention without departing from the spirit or scope of the invention. Thus, it is intended that the present invention cover the modifications and variations of this invention provided they come within the scope of the appended claims and their equivalents.

What is claimed is:

1. A device for detecting an error from within a digital data comprising:

storage means for temporarily storing received arbitrary bytes of parallel data in response to a control signal and for outputting the data in byte units;

logical operation means for subjecting each of the byte units of data from the storage means to an operation according to a preset logical operation equation in response to a control signal for producing data;

error detecting means for determining an occurrence of error with the data from the logical operation means; and controlling means for providing the control signals.

2. A device as claimed in claim 1, wherein the logical operation means includes:

a logic circuit part for composing a status after arbitrary clocks based on the data from the storage means; and temporary storage means for temporarily storing an output from the logic circuit part and for feeding the output back to the logic circuit part again.

3. A device as claimed in claim 1, wherein the error detection means generates an error detection signal from an output from the logical operation part produced when a last byte of data from a received block unit of data is received at the storage means and applied to the logical operation means.

4. A device as claimed in claim 1, wherein the storage means includes a plurality of 8 bit latches.

5. A device as claimed in claim 2, wherein the logic circuit part subjects an output from the storage means and a signal fed back from the temporary storage part to an exclusive OR operation.

6. A device as claimed in claim 2, wherein the temporary storage part includes a plurality of D type flipflops.

7. A device as claimed in claim 6, wherein a number of D type flipflops is 32.

8. A device as claimed in claim 1, wherein the error detection means includes a NOR gate having 32 inputs.

9. A device as claimed in claim 4, wherein the number of 8 bit latches is 4.

* * * * *